(12) United States Patent
Lee et al.

(10) Patent No.: US 11,091,073 B2
(45) Date of Patent: Aug. 17, 2021

(54) HUMIDITY-RESPONSIVE SEAT CONTROL DEVICE FOR VEHICLE

(71) Applicants: HYUNDAI MOTOR COMPANY, Seoul (KR); KIA MOTORS CORPORATION, Seoul (KR)

(72) Inventors: Baek Hee Lee, Suwon-si (KR); Min Hyuk Kwak, Seoul (KR); Jong Hun Lee, Hwaseong-si (KR); Hyun Kyu Park, Hwaseong-si (KR); Yo Seob Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/909,668

(22) Filed: Jun. 23, 2020

(65) Prior Publication Data

US 2021/0129721 A1    May 6, 2021

(30) Foreign Application Priority Data

Oct. 30, 2019   (KR) .......................... 10-2019-0136048

(51) Int. Cl.
| | |
|---|---|
| *A47C 7/72* | (2006.01) |
| *A47C 31/00* | (2006.01) |
| *B60N 2/56* | (2006.01) |
| *B60N 2/58* | (2006.01) |
| *G01K 13/00* | (2021.01) |
| *G01K 3/00* | (2006.01) |

(52) U.S. Cl.
CPC ......... *B60N 2/5657* (2013.01); *B60N 2/5678* (2013.01); *B60N 2/58* (2013.01); *G01K 3/005* (2013.01); *G01K 13/00* (2013.01)

(58) Field of Classification Search
CPC ........ A47C 7/74; A47C 7/744; B60N 2/5664; B60N 2/5657
See application file for complete search history.

(56) References Cited

U.S. PATENT DOCUMENTS

| | | | | |
|---|---|---|---|---|
| 7,461,892 B2* | 12/2008 | Bajic | ........................ | A47C 7/72 297/180.1 |
| 7,832,798 B2* | 11/2010 | Bajic | ........................ | A47C 7/72 297/180.16 |

(Continued)

OTHER PUBLICATIONS

Yao, et al., "bioPrint: A Liquid Deposition Printing System for Natural Actuators, 3D Printing and Additive Manufacturing," No. 2, vol. 4, 2015, pp. 169-179.

*Primary Examiner* — Shin H Kim
(74) *Attorney, Agent, or Firm* — Morgan, Lewis & Bockius LLP (57) ABSTRACT

A humidity-responsive seat control device for a vehicle employs a self-transforming film including a kind of biomaterial configured to operate to be opened through gradual shrinkage thereof when humidity of a seat cover or humidity inside of the seat cover increases while operating to be closed through gradual expansion thereof when the humidity of the seat cover or the humidity inside of the seat cover decreases, thereby being capable of not only achieving smooth air ventilation in an area where a body portion of a seat occupant contacts the seat cover, but also automatically adjusting an amount of air discharged outwards through the self-transforming film in accordance with humidity.

17 Claims, 9 Drawing Sheets

(56) References Cited

U.S. PATENT DOCUMENTS

| | | | | |
|---|---|---|---|---|
| 8,636,670 | B2* | 1/2014 | Ferren | G08B 21/06 |
| | | | | 600/529 |
| 9,931,829 | B2* | 4/2018 | Yao | B29C 64/364 |
| 10,725,002 | B2* | 7/2020 | Roseway | G01N 31/224 |
| 2005/0173950 | A1* | 8/2005 | Bajic | A47C 7/744 |
| | | | | 297/180.14 |
| 2009/0284052 | A1* | 11/2009 | Bajic | B60N 2/5664 |
| | | | | 297/180.1 |
| 2010/0253117 | A1* | 10/2010 | Bajic | A47C 7/744 |
| | | | | 297/180.12 |
| 2012/0319439 | A1* | 12/2012 | Lofy | F25B 49/00 |
| | | | | 297/180.1 |
| 2016/0121546 | A1* | 5/2016 | Yao | B29C 64/112 |
| | | | | 428/221 |
| 2019/0390288 | A1* | 12/2019 | Ishikawa | C12N 1/20 |

* cited by examiner

HUMIDITY-RESPONSIVE SEAT CONTROL DEVICE FOR VEHICLE

CROSS-REFERENCE TO RELATED APPLICATION

This application claims priority, under 35 U.S.C. § 119(a), to Korean Patent Application No. 10-2019-0136048 filed on Oct. 30, 2019, the entire contents of which are incorporated herein by reference.

TECHNICAL FIELD

The present disclosure relates to a humidity-responsive seat control device for a vehicle, and more particularly, to a humidity-responsive seat control device for a vehicle, which employs a self-transforming film performing an opening or closing operation in accordance with a humidity of a seat cover or a humidity inside of the seat cover, thereby being capable of achieving smooth air ventilation in an area where the human body contacts the seat cover.

BACKGROUND

When a driver or passenger is seated on a vehicle seat for a long time, air circulation may be insufficiently provided to a body portion of the driver or passenger closely contacting a seat cover. In this case, the body portion contacting the seat cover (in particular, the heap, etc.) is likely to sweat and, as such, the driver or passenger may experience discomfort.

In order to solve such drawbacks, a ventilated seat having a plurality of air holes formed through a seat cover is provided in a vehicle. Cold air produced in an air conditioner in the vehicle is supplied to the air holes of the seat cover after passing through a duct, and is then discharged out of the seat cover, and as such, the ventilated seat may provide better seat comfort.

However, the ventilated seat has a drawback in that, since the air holes of the seat cover have a fixed size of about 1 mm, the amount of air discharged outwards through the air holes is very small.

Furthermore, in summer, there may be a limitation in providing comfort to an occupant of the seat by an insufficient amount of air discharged outwards through the air holes of the seat cover because the temperature and humidity at an area where the body portion of the occupant closely contacts the seat cover may rapidly increase in summer.

SUMMARY OF THE DISCLOSURE

The present disclosure has been made in an effort to solve the above-described problems associated with the prior art, and an object of the present disclosure is to provide a humidity-responsive seat control device for a vehicle, which employs a self-transforming film including a kind of biomaterial configured to operate to be opened through gradual shrinkage thereof when the humidity of a seat cover or the humidity inside of the seat cover increases while operating to be closed through gradual expansion thereof when the humidity of a seat cover or the humidity inside of the seat cover decreases, thereby being capable of not only achieving smooth air ventilation in an area where a body portion of a seat occupant contacts the seat cover, but also automatically adjusting an amount of air discharged outwards through the self-transforming film in accordance with humidity.

In one aspect, the present disclosure provides a humidity-responsive seat control device for a vehicle including a humidity sensor mounted to a seat at a first predetermined position, to sense a humidity, a temperature sensor mounted to the seat at a second predetermined position, to sense a temperature, a seat pad formed with an air channel, through which air from an air conditioner flows, a controller configured to adjust an air blower stage of the air conditioner to supply air to the air channel of the seat pad in accordance with the humidity sensed by the humidity sensor, a seat cover covering the seat pad, the seat cover having a structure formed with a plurality of air holes at a portion thereof contacting a body of a seat occupant, and a self-transforming film attached to an inner peripheral surface of each of the air holes, the self-transforming film having a structure including a film substrate and a biomaterial coated on one surface of the film substrate, the biomaterial expanding or shrinking in accordance with humidity variation. When the current humidity is higher than a reference humidity, the biomaterial of the self-transforming film bends the film substrate while expanding, thereby increasing an opening degree of the air hole, whereas, when the current humidity is lower than the reference humidity, the biomaterial of the self-transforming film deploys the film substrate while shrinking, thereby decreasing the opening degree of the air hole.

In another aspect, the present disclosure provides a humidity-responsive seat control device for a vehicle including a humidity sensor mounted to a seat at a first predetermined position, to sense a humidity, a temperature sensor mounted to the seat at a second predetermined position, to sense a seat surface temperature, a seat pad formed with an air channel, through which air from an air conditioner flows, a controller configured to adjust an air blower stage of the air conditioner to supply air to the air channel of the seat pad in accordance with the humidity sensed by the humidity sensor, an woven seat cover covering the seat pad, and a ventilation filter disposed between the woven seat cover and the seat pad, the ventilation filter including a mesh structure formed with a plurality of air holes, and a self-transforming film attached to an inner peripheral surface of each of the air holes in the mesh structure, the self-transforming film having a structure including a film substrate and a biomaterial coated on one surface of the film substrate, the biomaterial expanding or shrinking in accordance with humidity variation. When the current humidity is higher than a reference humidity, the biomaterial of the self-transforming film bends the film substrate while expanding, thereby increasing an opening degree of the air hole, whereas, when the current humidity is lower than the reference humidity, the biomaterial of the self-transforming film deploys the film substrate while shrinking, thereby decreasing the opening degree of the air hole.

In a preferred embodiment, the self-transforming film may include a film substrate attached to the inner peripheral surface of the air hole in the mesh structure, and a natto-cell coated on one surface of the film substrate, the natto-cell containing bacteria expanding or shrinking in accordance with humidity variation.

In another preferred embodiment, the controller may be configured to, when the humidity sensed by the humidity sensor increases from the reference humidity, adjust the air blower stage of the air conditioner to increase from a minimum stage to a maximum stage in a stepwise manner during operation of the air conditioner.

In still another preferred embodiment, the controller may be configured to, when the humidity sensed by the humidity sensor is 65 to 75%, automatically adjust the air blower stage of the air conditioner to a minimum one of first to third stages, which is the first stage, during operation of the air conditioner. The controller may be configured to, when the humidity sensed by the humidity sensor is greater than 75 and equal to or less than 85%, automatically adjust the air blower stage of the air conditioner to a second one of first to third stages during operation of the air conditioner. The controller may be configured to, when the humidity sensed by the humidity sensor exceeds 85%, automatically adjust the air blower stage of the air conditioner to a maximum one of first to third stages, which is the third stage, during operation of the air conditioner.

In yet another preferred embodiment, the controller may be configured to, when the temperature sensed by the temperature sensor reaches a target temperature, output a control signal to cause the air conditioner to be turned off.

It is understood that the terms "vehicle", "vehicular" and other similar terms as used herein are inclusive of motor vehicles in general such as passenger automobiles including sport utility vehicles (SUVs), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel (e.g. fuels derived from resources other than petroleum) vehicles. As referred to herein, a hybrid electric vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below.

First, a humidity-responsive seat control device for a vehicle according to an embodiment of the present disclosure will be described in conjunction with a configuration and operation thereof.

Figure 1:
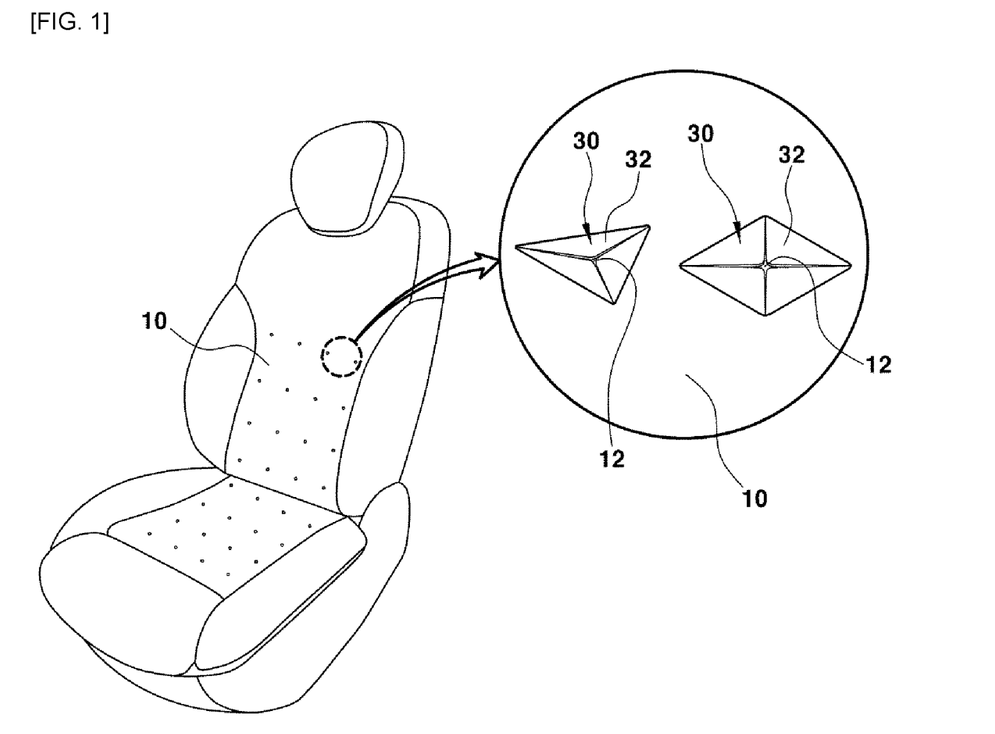
FIGS. 1 and 2 are enlarged perspective views illustrating states in which a self-transforming film of a seat cover included in a humidity-responsive seat control device according to an embodiment of the present disclosure is closed and opened in accordance with humidity, respectively.
Figure 2:
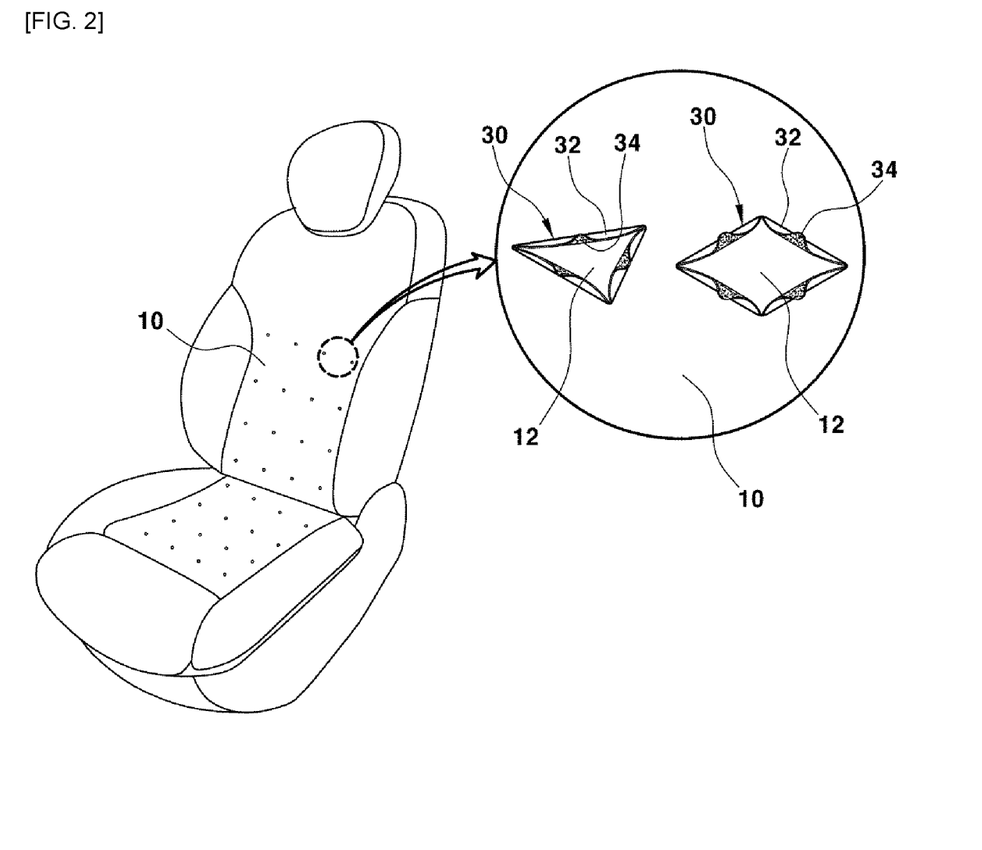
Figure 3:
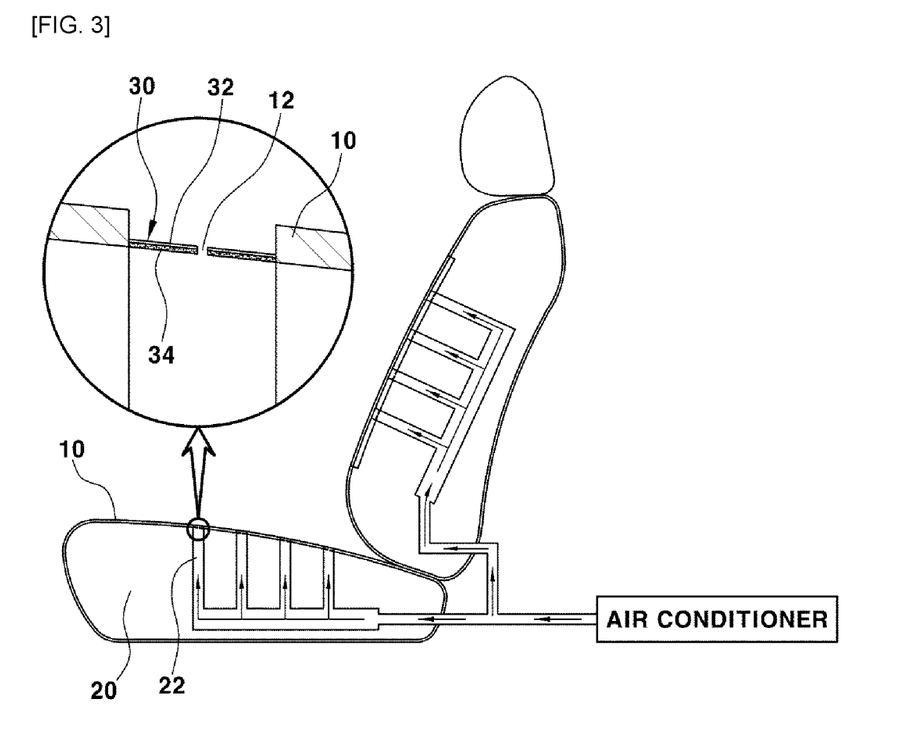
FIGS. 3 and 4 are enlarged sectional views illustrating states in which the self-transforming film of the seat cover included in the humidity-responsive seat control device according to the illustrated embodiment of the present disclosure is closed and opened in accordance with humidity, respectively.
Figure 4:
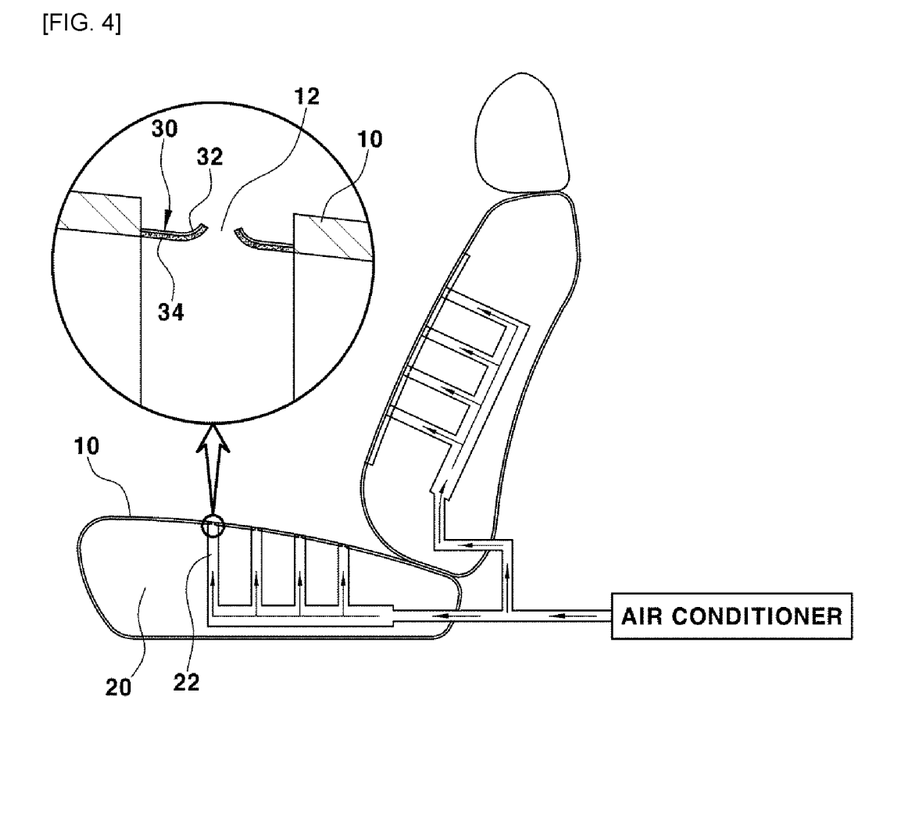

FIGS. 1 and 3 illustrate a state in which a self-transforming film of a seat cover included in the humidity-responsive seat control device according to the illustrated embodiment of the present disclosure operates to be closed in accordance with a decrease in humidity. FIGS. 2 and 4 illustrate a state in which the self-transforming film of the seat cover included in the humidity-responsive seat control device according to the illustrated embodiment of the present disclosure operates to be opened in accordance an increase in humidity.

As shown in FIGS. 1 to 4, a plurality of air holes 12 is formed around a portion of a seat cover 10 to contact a body portion of a seat occupant. Air channels 22 are formed at a seat pad 20 covered by the seat cover 10. Air supplied from an air conditioner flows through the air channels 22.

In particular, a self-transforming film 30, which expands or shrinks in accordance with humidity variation, is attached to an inner peripheral surface of each air hole 12 of the seat cover 10.

In more detail, the self-transforming film 30 includes a film substrate 32 attached to the inner peripheral surface of the air hole 12, and a natto cell 34 coated on one surface of the film substrate 32. The natto cell 34 includes a kind of bacteria expanding or shrinking in accordance with humidity variation.

Figure 9:
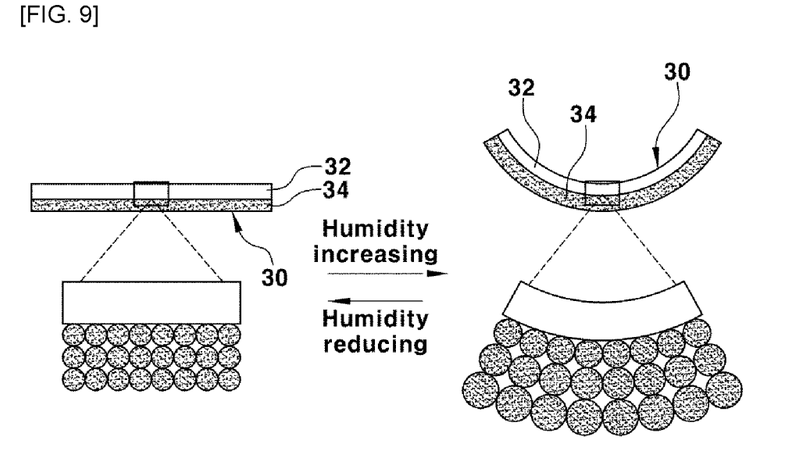
FIG. 9 is a schematic view illustrating a principle that the self-transforming film of the humidity-responsive seat control device according to the present disclosure is closed and opened.

In this case, the natto cell 34 includes a kind of biomaterial containing bacteria having characteristics of expanding gradually as ambient humidity increases and shrinking gradually as ambient humidity decreases. As shown in FIG. 9, the natto cell 34 functions as an actuator expanding to bend the film substrate 32 in accordance with an increase in humidity while shrinking to deploy the film substrate 32 to be flat in accordance with a decrease in humidity.

Preferably, the self-transforming film 30 may have a structure having more than two or three triangular wings attached to the inner peripheral surface of the air hole 12 while being uniformly arranged in a peripheral direction of the air hole 12.

Accordingly, when current humidity is higher than reference humidity, the natto cell 34 of the self-transforming film 30 expands, thereby causing the film substrate 32 to be bent, and as such, an opening degree of the air hole 12 increases. On the other hand, when the current humidity is lower than the reference humidity, the natto cell 34 of the self-transforming film 30 shrinks, thereby causing the film substrate 32 to deploy to be flat and, as such, the opening degree of the air hole 12 decreases.

In other words, when the current humidity of a seat surface with which the body of a seat occupant is in contact is higher than the reference humidity, the natto cell 34 performs an actuating function to bend the film substrate 32 while expanding, thereby increasing the opening degree of the air hole 12, as shown in FIGS. 2 and 4. On the other hand, when the current humidity of the seat surface with which the body of the seat occupant is in contact is lower than the reference humidity, the natto cell 34 performs an actuating function to deploy the film substrate 32 to be flat while shrinking, thereby decreasing the opening degree of the air hole 12, as shown in FIGS. 1 and 3.

Accordingly, when an increase in humidity occurs at a body portion of the seat occupant contacting the seat cover 10, the film substrate 32 of the self-transforming film 30 is bent, thereby increasing the opening degree of the air hole 12. In this case, air ventilation in an area where the body of the occupant contacts the seat cover 10 may be smoothly carried out.

Furthermore, cold air supplied from the air conditioner to the air channels 22 of the seat pad 20 is discharged outwards from the seat cover 10 through the air holes 12 increased in opening degree, as described above, and, as such, comfort of the body portion contacting the seat cover 10 may be enhanced.

Figure 10:
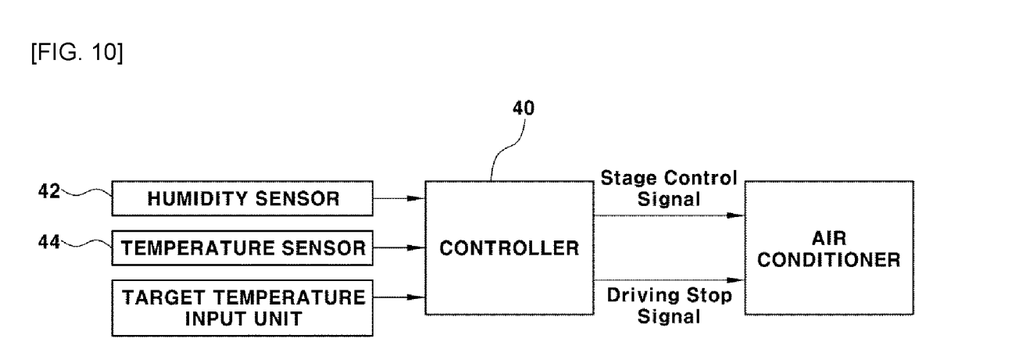
FIG. 10 is a block diagram of the humidity-responsive seat control device according to the present disclosure.

Meanwhile, as shown in FIG. 10, the seat control device according to the illustrated embodiment of the present disclosure further includes a humidity sensor 42 mounted to the seat at a predetermined position, to sense a seat surface humidity, a temperature sensor 44 mounted to the seat at a predetermined position, to sense a seat surface temperature, and a controller 40 configured to adjust an air blower stage of the air conditioner to supply air to the air channels 22 of the seat pad 20 in accordance with current humidity sensed by the humidity sensor 44.

In this case, when a humidity in the area where a body portion of the seat occupant contacts the seat cover 10 increases, the natto cell 34 of each self-transforming film 30 expands to bend the film substrate 32, thereby increasing the opening degree of the corresponding air hole 12, as described above. Furthermore, when the current humidity sensed by the humidity sensor 42 increases gradually from the reference humidity, the air blower stage of the air conditioner is adjusted to increase gradually from a minimum stage to a maximum stage during operation of the air conditioner under control of the controller 40.

For example, when the current humidity sensed by the humidity sensor 42 is 65 to 75%, the natto cell 34 of the self-transforming film 30 expands to a minimum level thereof to bend the film substrate 32 to a minimum level thereof, thereby increasing the opening degree of the air hole 12 to a minimum level from a closed state. In addition, the air blower stage of the air conditioner may be automatically adjusted to a minimum one of first to third stages, that is, a first stage, during operation of the air conditioner under control of the controller 40.

That is, since the opening degree of the air hole 12 is minimally increased from a closed state in this case, the air blower stage of the air conditioner is also automatically adjusted to the first stage in order to discharge an optimal amount of air through the air hole 12.

Accordingly, cold air according to the first air blower stage of the air conditioner is discharged outwards from the seat cover 10 through the air holes 12 minimally increased in opening degree after passing through the air channels 22 of the seat pad 20. Thus, the body portion of the seat occupant contacting the seat cover 10 may feel comfortable.

On the other hand, when the current humidity sensed by the humidity sensor 42 is greater than 75% and equal to or less than 85%, the natto cell 34 of the self-transforming film 30 expands from the minimum level thereof to a middle level thereof to bend the film substrate 32 from the minimum level thereof to a middle level thereof, thereby increasing the opening degree of the air hole 12 from the minimum level to a middle level. In addition, the air blower stage of the air conditioner may be automatically adjusted to a second one of the first to third stages during operation of the air conditioner under control of the controller 40.

As the current humidity increases gradually to greater than 75% but no more than 85%, the film substrate 32 of the self-transforming film 30 is bent to the middle level thereof, as described above, thereby causing the opening degree of the air hole 12 to increase from the minimum level to the middle level. In accordance with the increased opening degree of the air hole 12 together with the second air blower stage, the amount and intensity of air discharged outwards from the seat cover 10 through the air hole 12 are increased, and as such, the body portion contacting the seat cover 10 may feel comfortable.

On the other hand, when the current humidity sensed by the humidity sensor 42 exceeds 85%, the natto cell 34 of the self-transforming film 30 expands to a maximum level thereof to bend the film substrate 32 to the maximum level thereof, thereby increasing the opening degree of the air hole 12 to a maximum level. In addition, the air blower stage of the air conditioner may be automatically adjusted to a maximum one of the first to third stages, that is, a third stage, during operation of the air conditioner under control of the controller 40.

When the current humidity sensed by the humidity sensor 42 exceeds 85%, the film substrate 32 of the self-transforming film 30 is bent to the maximum level thereof, thereby increasing the opening degree of the air hole 12 to a maximum level, as described above. In accordance with the maximum opening degree of the air hole 12 together with the third air blower stage, the amount and intensity of air discharged outwards from the seat cover 10 through the air hole 12 are maximally increased, and as such, the body portion contacting the seat cover 10 may feel comfortable.

As described above, in accordance with the illustrated embodiment of the present disclosure, smooth air ventilation in an area where a body portion of the seat occupant contacts a seat cover (for example, a leather seat cover) may achieved through application of the self-transforming film operating to be opened when humidity at the seat cover is high while operating to be closed when the humidity at the seat cover is low. In addition, as the humidity increases gradually, the amount of air discharged outwards through the self-transforming film is automatically adjusted to increase. Accordingly, comfort of the body portion contacting the seat cover may be enhanced.

Meanwhile, when the seat surface temperature sensed by the temperature sensor 44 reaches a target temperature that is a comfort temperature desired by the user, the air conditioner may be turned off in accordance with a control signal from the controller 40.

Next, a humidity-responsive seat control device for a vehicle according to another embodiment of the present disclosure will be described in conjunction with a configuration and operation thereof.

Figure 5:
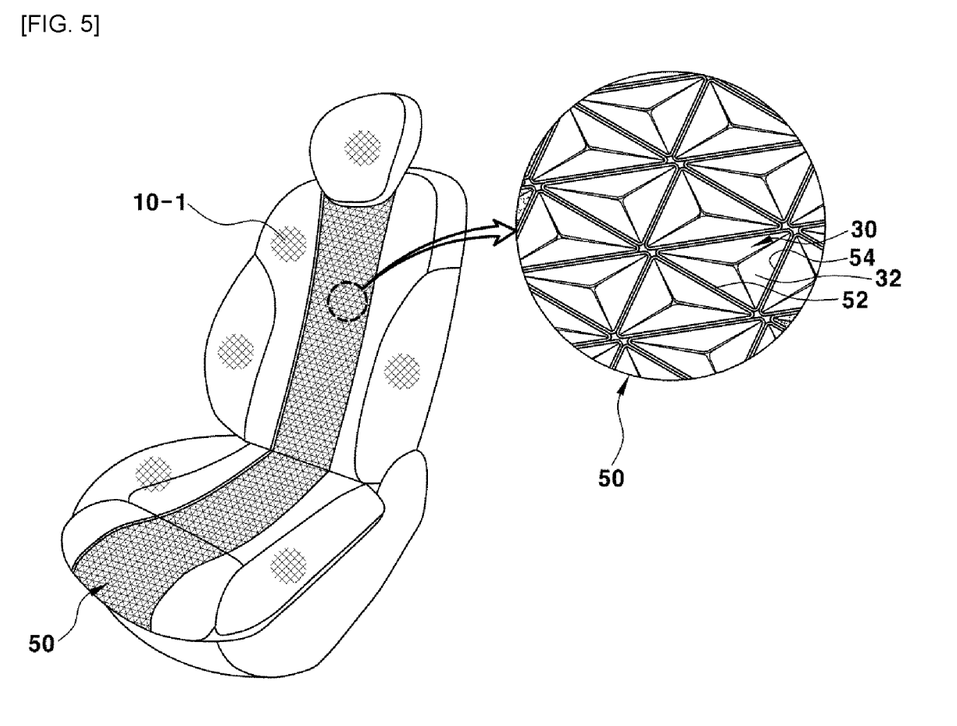
FIGS. 5 and 6 are enlarged perspective views illustrating states in which a self-transforming film of a ventilation filter applied to an inside of a seat cover included in a humidity-responsive seat control device according to another embodiment of the present disclosure is closed and opened in accordance with humidity, respectively.
Figure 6:
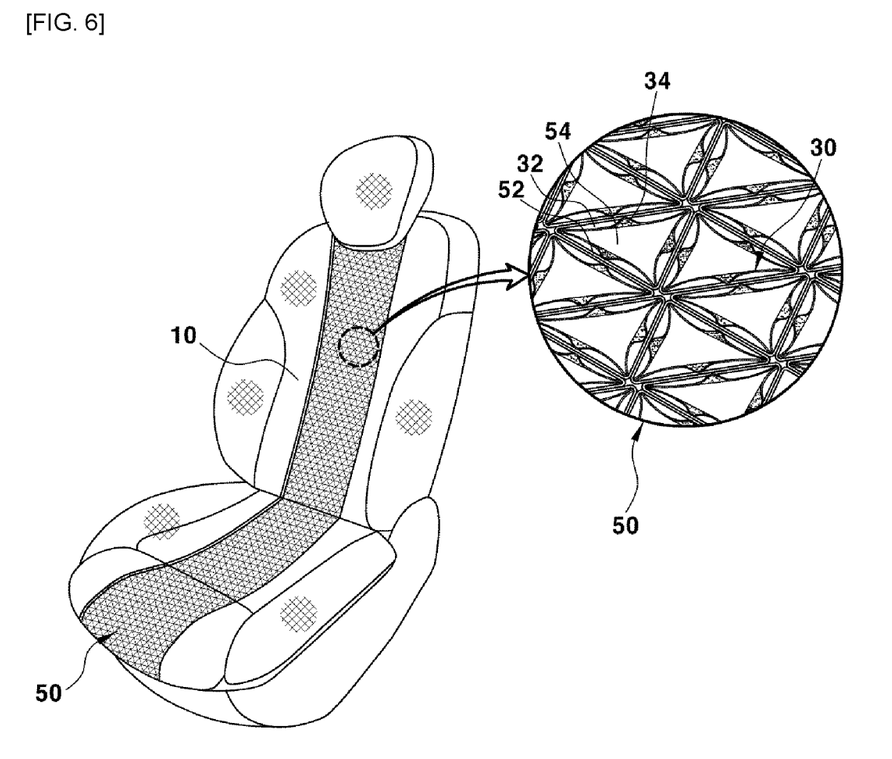
Figure 7:
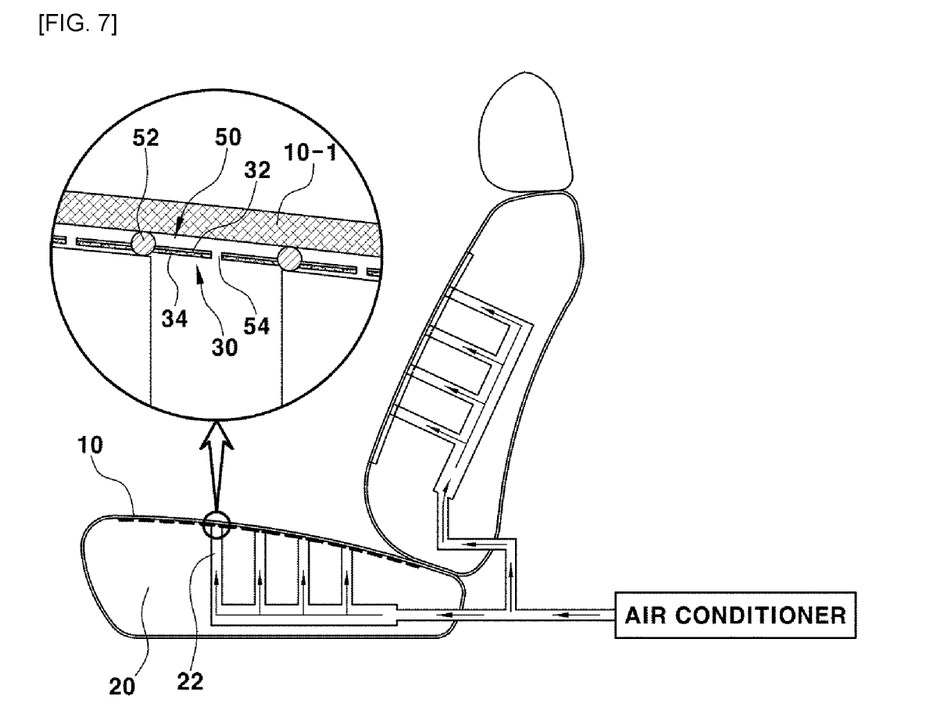
FIGS. 7 and 8 are enlarged sectional views illustrating states in which the self-transforming film of the ventilation filter applied to the inside of the seat cover included in the humidity-responsive seat control device according to the other embodiment of the present disclosure is closed and opened in accordance with humidity, respectively.
Figure 8:
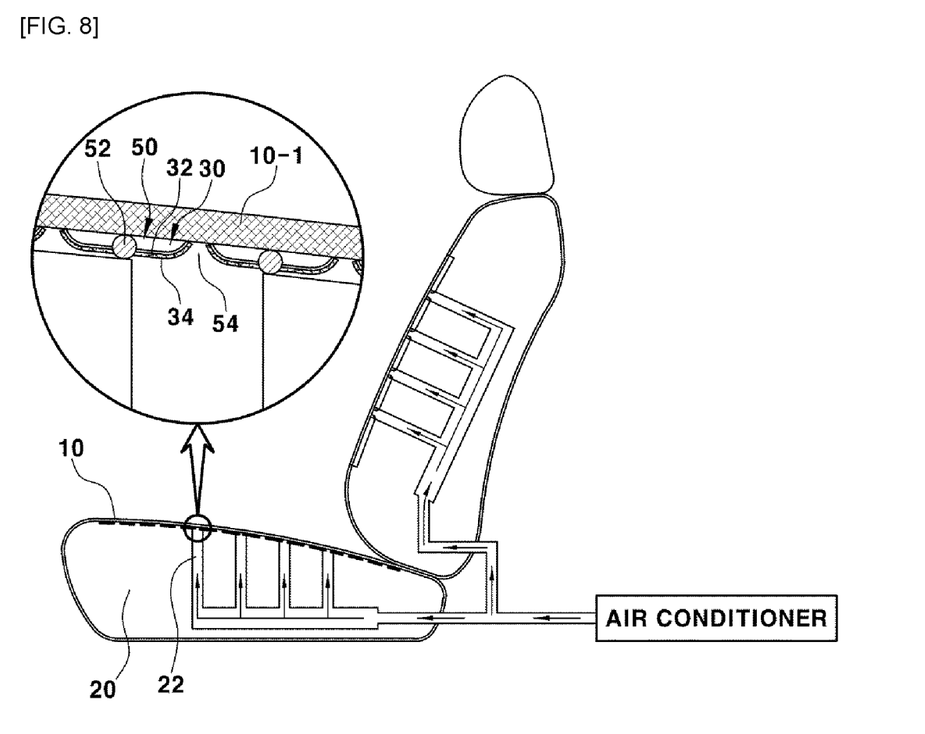

FIGS. 5 and 7 illustrate a state in which a self-transforming film of a ventilation filter applied to an inside of a seat cover included in the humidity-responsive seat control device according to the other embodiment of the present disclosure operates to be closed in accordance with humidity. FIGS. 6 and 8 illustrate a state in which the self-transforming film of the ventilation filter applied to the inside of the seat cover included in the humidity-responsive seat control device according to the other embodiment of the present disclosure operates to be opened in accordance with humidity.

As shown in FIGS. 5 to 8, the seat cover, which will contact the body of the seat occupant, employs a woven seat cover 10-1 having a ventilation property. Air channels 22 are formed at a seat pad 20 covered by the woven seat cover 10-1. Air supplied from an air conditioner flows through the air channels 22.

In particular, a ventilation filter 50 including a self-transforming film is disposed between the woven seat cover 10-1 and the seat pad 20.

The ventilation filter 50 includes a mesh structure 52 formed with a plurality of air holes 54, and a self-transforming film 30 made of a biomaterial expanding or shrinking in accordance with humidity and attached to an inner peripheral surface of each air hole 54 of the mesh structure 52.

As described above, the self-transforming film 30 includes a film substrate 32 attached to the inner peripheral surface of the air hole 54 of the mesh structure 52, and a natto cell 34 coated on one surface of the film substrate 32. The natto cell 34 includes a kind of bacteria expanding or shrinking in accordance with humidity variation.

In this case, the natto cell 34 includes a kind of biomaterial containing bacteria having characteristics of expanding gradually as an ambient humidity increases and shrinking gradually as ambient humidity decreases. As shown in FIG. 9, the natto cell 34 functions as an actuator expanding to bend the film substrate 32 in accordance with an increase in humidity while shrinking to deploy the film substrate 32 to be flat in accordance with a decrease in humidity.

Preferably, the self-transforming film 30 may have a structure having more than three triangular wings attached to the inner peripheral surface of the air hole 54 while being uniformly arranged in a peripheral direction of the air hole 54.

Accordingly, when current humidity is higher than reference humidity, the natto cell 34 of the self-transforming film 30 in the ventilation filter 50 expands, thereby causing the film substrate 32 of the self-transforming film 30 to be bent, and as such, an opening degree of the air hole 54 of the mesh structure 50 increases. On the other hand, when the current humidity is lower than the reference humidity, the natto cell 34 of the self-transforming film 30 in the ventilation filter 50 shrinks, thereby causing the film substrate 32 of the self-transforming film 30 to deploy to be flat, and as such, the opening degree of the air hole 54 of the mesh structure 52 decreases.

In other words, when the current humidity of the woven seat cover 10-1 with which the body of a seat occupant is in contact is higher than the reference humidity, the natto cell 34 performs an actuating function to bend the film substrate 32 while expanding, thereby increasing the opening degree of the air hole 54 in the mesh structure 52, as shown in FIGS. 6 and 8. On the other hand, when the current humidity of the woven seat cover 10-1 with which the body of the seat occupant is in contact is lower than the reference humidity, the natto cell 34 performs an actuating function to deploy the film substrate 32 to be flat while shrinking, thereby decreasing the opening degree of the air hole 54 in the mesh structure 52, as shown in FIGS. 5 and 7.

Accordingly, when an increase in humidity occurs at a body portion of the seat occupant contacting the woven seat cover 10-1, the film substrate 32 of the self-transforming film 30 is bent, thereby increasing the opening degree of the air hole 54 in the mesh structure 52. In this case, air ventilation in an area where the body of the occupant contacts the woven seat cover 10-1 may be smoothly carried out.

Furthermore, cold air supplied from the air conditioner to the air channels 22 of the seat pad 20 is discharged outwards from the ventilated woven seat cover 10-1 after passing through the air holes 54 of the mesh structure 52 increased in opening degree, as described above, and, as such, comfort of the body portion contacting the woven seat cover 10-1 may be enhanced.

In this case, when a humidity in the area where a body portion of the seat occupant contacts the woven seat cover 10-1 increases, the natto cell 34 of each self-transforming film 30 expands to bend the film substrate 32, thereby increasing the opening degree of the corresponding air hole 54 of the mesh structure 52, as described above. Furthermore, when the current humidity sensed by the humidity sensor 42 increases gradually from the reference humidity, the air blower stage of the air conditioner is adjusted to increase gradually from a minimum stage to a maximum stage during operation of the air conditioner under control of the controller 40.

For example, when the current humidity sensed by the humidity sensor 42 is 65 to 75%, the natto cell 34 of the self-transforming film 30 expands to a minimum level thereof to bend the film substrate 32 to a minimum level thereof, thereby increasing the opening degree of the air hole 54 in the mesh structure 52 to a minimum level from a closed state. In addition, the air blower stage of the air conditioner may be automatically adjusted to a minimum one of first to third stages, that is, a first stage, during operation of the air conditioner under control of the controller 40.

That is, since the opening degree of the air hole 12 is minimally increased from a closed state in this case, the air blower stage of the air conditioner is also automatically adjusted to the first stage in order to discharge an optimal amount of air through the air hole 54.

Accordingly, cold air according to the first air blower stage of the air conditioner is discharged outwards from the woven seat cover 10-1 through the air holes 54 of the mesh structure 52 minimally increased in opening degree after passing through the air channels 22 of the seat pad 20. Thus, the body portion of the seat occupant contacting the woven seat cover 10-1 may feel comfortable.

On the other hand, when the current humidity sensed by the humidity sensor 42 is greater than 75% and equal to or less than 85%, the natto cell 34 of the self-transforming film 30 expands from the minimum level thereof to a middle level thereof to bend the film substrate 32 from the minimum level thereof to a middle level thereof, thereby increasing the opening degree of the air hole 54 in the mesh structure 52 from the minimum level to a middle level. In addition, the air blower stage of the air conditioner may be automatically adjusted to a second one of the first to third stages during operation of the air conditioner under control of the controller 40.

As the current humidity increases gradually to greater than 75 but no more than 85%, the film substrate 32 of the self-transforming film 30 is bent to the middle level thereof, as described above, thereby causing the opening degree of the air hole 54 of the mesh structure 52 to increase from the minimum level to the middle level. In accordance with the increased opening degree of the air hole 54 together with the second air blower stage, the amount and intensity of air discharged outwards from the woven seat cover 10-1 through the air hole 54 are increased, and as such, the body portion contacting the woven seat cover 10-1 may feel comfortable.

On the other hand, when the current humidity sensed by the humidity sensor 42 exceeds 85%, the natto cell 34 of the self-transforming film 30 expands to a maximum level thereof to bend the film substrate 32 to the maximum level thereof, thereby increasing the opening degree of the air hole 54 of the mesh structure 52 to a maximum level. In addition, the air blower stage of the air conditioner may be automatically adjusted to a maximum one of the first to third stages, that is, a third stage, during operation of the air conditioner under control of the controller 40.

When the current humidity sensed by the humidity sensor 42 exceeds 85%, the film substrate 32 of the self-transforming film 30 is bent to the maximum level thereof, thereby increasing the opening degree of the air hole 54 in the mesh structure 52 to a maximum level, as described above. In accordance with the maximum opening degree of the air hole 54 together with the third air blower stage, the amount and intensity of air discharged outwards from the ventilated woven seat cover 10-1 after passing through the air hole 54 are maximally increased and, as such, comfort of the body portion contacting the woven seat cover 10-1 may be enhanced.

As described above, in accordance with the other embodiment of the present disclosure, smooth air ventilation in an area where a body portion of the seat occupant contacts the woven seat cover 10-1 may be achieved through application of the ventilation filter 50 having the self-transforming film 30 operating to be opened when humidity at the seat cover is high while operating to be closed when the humidity at the seat cover is low. In addition, as the humidity gradually increases, the amount of air discharged outwards through the ventilation filter 50 is automatically adjusted to increase. Accordingly, comfort of the body portion contacting the woven seat cover 10-1 may be enhanced.

Meanwhile, when the woven seat surface temperature sensed by the temperature sensor 44 reaches a target temperature desired by the user, the air conditioner may be turned off in accordance with a control signal from the controller 40.

The aforementioned operations/functions including, but not limited to, automatically adjustmenting, controlled by the controller can be embodied as computer readable code/algorithm/software stored on a computer readable recording medium. The computer readable recording medium is any data storage device that can store data which can thereafter be read by a computer or a processor/microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The aforementioned controller may include one or more processors/microprocessors and a non-transitory computer readable recording medium storing computer readable code/algorithm/software. Such processor(s)/microprocessor(s) may perform the above described operations/functions, by executing the computer readable code/algorithm/software stored on the computer readable recording medium.

As apparent from the above description, the present disclosure provides the following effects.

First, the humidity-responsive seat control device of the present disclosure employs a self-transforming film that is a kind of biomaterial configured to operate to be opened through gradual shrinkage thereof when the humidity of a seat cover or the humidity inside of the seat cover increases while operating to be closed through gradual expansion thereof when the humidity of a seat cover or the humidity inside of the seat cover decreases. Accordingly, smooth air ventilation in an area where a body portion of a seat occupant contacts the seat cover may be achieved.

Second, the amount of air discharged outwards after passing through the self-transforming film is automatically adjusted to increase in accordance with an increase in humidity. Accordingly, comfort of the occupant body portion contacting seat cover may be enhanced.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A humidity-responsive seat control device for a vehicle comprising:
   a humidity sensor mounted to a seat at a first predetermined position, to sense a humidity;
   a temperature sensor mounted to the seat at a second predetermined position, to sense a temperature;
   a seat pad formed with an air channel, through which air from an air conditioner flows;
   a controller configured to adjust an air blower stage of the air conditioner to supply air to the air channel of the seat pad in accordance with the humidity sensed by the humidity sensor;
   a seat cover covering the seat pad, the seat cover having a structure including a plurality of air holes; and
   a self-transforming film attached to an inner peripheral surface of each of the air holes, the self-transforming film having a structure comprising a film substrate and a biomaterial coated on the film substrate, the biomaterial expanding or shrinking in accordance with humidity variation,
   wherein, when the humidity is higher than a reference humidity, the biomaterial of the self-transforming film bends the film substrate while expanding, thereby increasing an opening degree of the air hole, whereas, when the humidity is lower than the reference humidity, the biomaterial of the self-transforming film deploys the film substrate while shrinking, thereby decreasing the opening degree of the air hole.

2. The humidity-responsive seat control device according to claim 1, wherein:
   the self-transforming film comprises a film substrate attached to the inner peripheral surface of the air hole, and a natto-cell coated on one surface of the film substrate, the natto-cell containing bacteria expanding or shrinking in accordance with humidity variation; and
   the natto-cell is adapted as an actuator expanding to bend the film substrate in accordance with an increase in humidity while shrinking to deploy the film substrate to be flat in accordance with a decrease in humidity.

3. The humidity-responsive seat control device according to claim 1, wherein the controller is configured to, when the humidity sensed by the humidity sensor increases from the reference humidity, adjust the air blower stage of the air conditioner to increase from a minimum stage to a maximum stage in a stepwise manner during operation of the air conditioner.

4. The humidity-responsive seat control device according to claim 3, wherein the controller is configured to, when the humidity sensed by the humidity sensor is 65 to 75%, automatically adjust the air blower stage of the air conditioner to a minimum one of first to third stages, which is the first stage, during operation of the air conditioner.

5. The humidity-responsive seat control device according to claim 3, wherein the controller is configured to, when the humidity sensed by the humidity sensor is greater than 75 and equal to or less than 85%, automatically adjust the air blower stage of the air conditioner to a second one of first to third stages during operation of the air conditioner.

6. The humidity-responsive seat control device according to claim 3, wherein the controller is configured to, when the humidity sensed by the humidity sensor exceeds 85%, automatically adjust the air blower stage of the air conditioner to a maximum one of first to third stages, which is the third stage, during operation of the air conditioner.

7. The humidity-responsive seat control device according to claim 1, wherein the controller is configured to, when the temperature sensed by the temperature sensor reaches a target temperature, output a control signal to cause the air conditioner to be turned off.

8. The humidity-responsive seat control device according to claim 1, wherein the humidity sensor is configured to sense a seat surface humidity, and
the temperature sensor is configured to sense a seat surface temperature.

9. The humidity-responsive seat control device according to claim 1, wherein the plurality of air holes are arranged at a portion of the seat cover to contact a body of a seat occupant.

10. A humidity-responsive seat control device for a vehicle comprising:
a humidity sensor mounted to a seat at a first predetermined position, to sense a humidity;
a temperature sensor mounted to the seat at a second predetermined position, to sense a temperature;
a seat pad having an air channel, through which air from an air conditioner flows;
a controller configured to adjust an air blower stage of the air conditioner to supply air to the air channel of the seat pad in accordance with the humidity sensed by the humidity sensor;
an woven seat cover covering the seat pad; and
a ventilation filter disposed between the woven seat cover and the seat pad, the ventilation filter comprising a mesh structure including a plurality of air holes, and a self-transforming film attached to an inner peripheral surface of each of the air holes in the mesh structure, the self-transforming film having a structure comprising a film substrate and a biomaterial coated on the film substrate, the biomaterial expanding or shrinking in accordance with humidity variation;
wherein, when the humidity is higher than a reference humidity, the biomaterial of the self-transforming film bends the film substrate while expanding, thereby increasing an opening degree of the air hole, whereas, when the humidity is lower than the reference humidity, the biomaterial of the self-transforming film deploys the film substrate while shrinking, thereby decreasing the opening degree of the air hole.

11. The humidity-responsive seat control device according to claim 10, wherein:
the self-transforming film comprises a film substrate attached to the inner peripheral surface of the air hole in the mesh structure, and a natto-cell coated on one surface of the film substrate, the natto-cell containing bacteria expanding or shrinking in accordance with humidity variation; and
the natto cell is adapted as an actuator expanding to bend the film substrate in accordance with an increase in humidity while shrinking to deploy the film substrate to be flat in accordance with a decrease in humidity.

12. The humidity-responsive seat control device according to claim 10, wherein the controller is configured to, when the humidity sensed by the humidity sensor increases from the reference humidity, adjust the air blower stage of the air conditioner to increase from a minimum stage to a maximum stage in a stepwise manner during operation of the air conditioner.

13. The humidity-responsive seat control device according to claim 12, wherein the controller is configured to, when the humidity sensed by the humidity sensor is 65 to 75%, automatically adjust the air blower stage of the air conditioner to a minimum one of first to third stages, which is the first stage, during operation of the air conditioner.

14. The humidity-responsive seat control device according to claim 12, wherein the controller is configured to, when the humidity sensed by the humidity sensor is greater than 75 and equal to or less than 85%, automatically adjust the air blower stage of the air conditioner to a second one of first to third stages during operation of the air conditioner.

15. The humidity-responsive seat control device according to claim 12, wherein the controller is configured to, when the humidity sensed by the humidity sensor exceeds 85%, automatically adjust the air blower stage of the air conditioner to a maximum one of first to third stages, which is the third stage, during operation of the air conditioner.

16. The humidity-responsive seat control device according to claim 10, wherein the controller is configured to, when the temperature sensed by the temperature sensor reaches a target temperature, output a control signal to cause the air conditioner to be turned off.

17. The humidity-responsive seat control device according to claim 10, wherein the humidity sensor is configured to sense a seat surface humidity, and
the temperature sensor is configured to sense a seat surface temperature.

* * * * *